United States Patent [19]

Vail, III

[11] Patent Number: 5,187,440

[45] Date of Patent: * Feb. 16, 1993

[54] MEASURING RESISTIVITY CHANGES FROM WITHIN A FIRST CASED WELL TO MONITOR FLUIDS INJECTED INTO OIL BEARING GEOLOGICAL FORMATIONS FROM A SECOND CASED WELL WHILE PASSING ELECTRICAL CURRENT BETWEEN THE TWO CASED WELLS

[75] Inventor: William B. Vail, III, Bothell, Wash.

[73] Assignee: Para Magnetic Logging, Inc., Woodinville, Wash.

[*] Notice: The portion of the term of this patent subsequent to Aug. 27, 2008 has been disclaimed.

[21] Appl. No.: 749,136

[22] Filed: Aug. 23, 1991

Related U.S. Application Data

[63] Continuation-in-part of Ser. No. 435,273, Oct. 30, 1989, Pat. No. 5,043,668, which is a continuation of Ser. No. 89,697, Aug. 26, 1987, Pat. No. 4,882,542, which is a continuation-in-part of Ser. No. 927,115, Nov. 4, 1986, Pat. No. 4,820,989.

[51] Int. Cl.[5] .............................................. G01V 3/20
[52] U.S. Cl. .................................... 324/372; 324/368
[58] Field of Search .............. 324/368, 372, 357, 354, 324/348, 370, 371

[56] References Cited

U.S. PATENT DOCUMENTS

| | | | |
|---|---|---|---|
| 2,400,593 | 5/1946 | Neufeld | 324/368 |
| 3,488,574 | 1/1970 | Tangay | 324/372 X |
| 4,796,186 | 1/1989 | Kaufman | 324/368 X |
| 4,820,989 | 4/1989 | Vail, III | 324/368 |
| 4,837,518 | 6/1989 | Gard et al. | 324/368 |
| 4,882,542 | 11/1989 | Vail, III | 324/368 |
| 4,901,023 | 2/1990 | Vail, III | 324/368 X |
| 5,043,668 | 8/1991 | Vail, III | 324/368 |
| 5,043,669 | 8/1991 | Vail, III | 324/368 |

FOREIGN PATENT DOCUMENTS 2207278 6/1974 France.

OTHER PUBLICATIONS

Mamedov, "Effectiveness of Resistivity Logging of Cased Wells by a Six-Electrode Tool", Izv. Vyssh. UCHEB. ZAVEDENII, NEFT GAZ., No. 7, Jul. 1987, pp. 11-15.

Mitchell, "Using Resistivity Measurements to Determine Distance Between Wells", Journal of Petroleum Technology, Jun. 1972, pp. 723-740.

Primary Examiner—Gerard R. Strecker
Assistant Examiner—Warren S. Edmonds

[57] ABSTRACT

A.C. current is conducted through geological formations separating two cased wells in an oil field undergoing enhanced oil recovery operations such as water flooding operations. Methods and apparatus are disclosed to measure the current leakage conducted into a geological formation from within a first cased well that is responsive to fluids injected into formation from a second cased well during the enhanced oil production activities. The current leakage and apparent resistivity measured within the first cased well are responsive to fluids injected into formation from the second cased well provided the distance of separation between the two cased wells is less than, or on the order of, a Characteristic Length appropriate for the problem.

9 Claims, 6 Drawing Sheets

MEASURING RESISTIVITY CHANGES FROM WITHIN A FIRST CASED WELL TO MONITOR FLUIDS INJECTED INTO OIL BEARING GEOLOGICAL FORMATIONS FROM A SECOND CASED WELL WHILE PASSING ELECTRICAL CURRENT BETWEEN THE TWO CASED WELLS

This invention was made with Government support under DOE Grant No. DE-FG06-84ER13294, entitled "Validating the ParaMagnetic Logging Effect", Office of Basic Energy Sciences, of the U.S. Department of Energy. The government has certain rights in this invention. The basic concept for the invention described herein was conceived during the funding provided by the above grant.

Ongoing research to measure resistivity through casing has been provided on a co-funded basis from: (a) U.S. Department of Energy Grant No. DE-FG19-88BC14243 entitled "Proof of Feasibility of Thru Casing Resistivity Technology"; (b) U.S. Department of Energy (DOE) Grant NO. DE-FG22-90BC14617 entitled "Proof of Concept of Moving Thru Casing Resistivity Apparatus"; and (c) Gas Research Institute (GRI) Contract No. 5088-212-1664 entitled "Proof of Feasibility of the Through Casing Resistivity Technolgy". The government and the GRI have certain rights in this invention. The application herein was filed during periods of time funded by (b) and (c) above.

This application is a Continuation-in-Part Application of an earlier Continuation Application that is entitled "Methods and Apparatus for Measurement of Electronic Properties of Geological Formations Through Borehole Casing"; which is Ser. No. 07/435,273; which has filing date of Oct. 30, 1989; and that issued on Aug. 27, 1991 as U.S. Pat. No. 5,043,668.

Ser. No. 07,435,273 is a Continuation Application of an earlier Continuation-in-Part Application also having the title of "Methods and Apparatus for Measurement of Electronic Properties of Geological Formations Through Borehole Casing"; which is Ser. No. 07/089,697; which has the Filing Date of Aug. 26, 1987; and which issued on Nov. 21, 1989 as U.S. Pat. No. 4,882,542.

The earlier Continuation-in-Part Application with Ser. No. 07/089,697 is derived from the original Parent Application having the title "Methods and Apparatus for Measurement of the Resistivity of Geological Formations from Within Cased Boreholes"; which is Ser. No. 06/927,115; which has the Filing Date of Nov. 4, 1986; and which issued on Apr. 11, 1989 as U.S. Pat. No. 4,820,989.

This invention provides improved methods and apparatus for measurement of the electronic properties of formations such as the resistivities, polarization phenomena, and dielectric constants of geological formations and cement layers adjacent to cased boreholes and for measuring the skin effect of the casing present. The terms "electronic properties of formations" and "electrochemical properties of formations" are used interchangeably herein. The methods and apparatus herein are used to measure the properties of fluids injected into formation in oil fields having at least two cased wells.

The oil industry has long sought to measure resistivity through casing. Such resistivity measurements, and measurements of other electrochemical phenomena, are useful for at least the following purposes: locating bypassed oil and gas; reservoir evaluation; monitoring water floods; measuring quantitative saturations; cement evaluation; permeability measurements; and measurements through a drill string attached to a drilling bit. Therefore, measurements of resistivity and other electrochemical phenomena through metallic pipes, and steel pipes in particular, are an important subject in the oil industry. Many U.S. patents have issued in the current pertinent Subclass 368 of Class 324 of the United States Patent and Trademark Office which address this subject. The following presents a brief description of the particularly relevant prior art presented in the order of descending relative importance.

U.S. patents which have already issued to the inventor in this field are listed as follows: U.S. Pat. No. 4,820,989 (Ser. No. 06/927,115) and U.S. Pat. No. 4,882,542 (Ser. No. 07/089,697). U.S. Pat. No. 5,043,688 (Ser. No. 07/435,273) issued on Aug. 27, 1991 to the inventor. These three patents generally describe apparatus having two pairs of voltage measurement electrodes which engage the interior of the casing, and which also have calibration means to calibrate for thickness variations and errors in the placements of the electrodes. Ser. No. 07/434,886, now U.S. Pat. No. 5,075,626, issued on Dec. 24, 1991, describes methods of operation of the invention providing for increased accuracy of measurement and for movement of the apparatus. U.S. Pat. No. 5,043,669 (Ser. No. 07/438,268), which issued on Aug. 27, 1991 to the inventor, provides for the measurement of resistivity from within casing in the presence of an additional acoustic energy source. Collectively, these patents are referenced below as the "Vail patents" which have been assigned to ParaMagnetic Logging, Inc. of Woodinville, Wash.

U.S. Pat. No. 4,796,186 which issued on Jan. 3, 1989 to Alexander A. Kaufman entitled "Conductivity Determination in a Formation Having a Cased Well" also mostly describes apparatus having two pairs of voltage measurement electrodes which engage the interior of the casing and which also have calibration means to calibrate for thickness variations in the casing and for errors in the placements of the electrodes. This patent has been assigned to ParaMagnetic Logging, Inc. of Woodinville, Wash. In general, different methods of operation are described in the Kaufman patent compared to the Vail patents cited above.

U.S. Pat. No. 4,837,518 which issued on Jun. 6, 1989 to Michael F. Gard, John E. E. Kingman, and James D. Klein, assigned to the Atlantic Richfield Company, entitled "Method and Apparatus for Measuring the Electrical Resistivity of Geologic Formations Through Metal Drill Pipe or Casing", describes multiple voltage measurement electrodes within a cased well which engage the wall of the casing, henceforth referenced as "Arco's patent". However, Arco's patent does not describe an apparatus with two pairs of adjacent voltage measurement electrodes and associated electronics which takes the voltage differential between these two pairs to directly measure electronic properties adjacent to formations. Therefore, Arco's patent does not describe the methods and apparatus disclosed herein.

USSR Patent No. 56,026, which issued on Nov. 30, 1939 to L. M. Alpin, henceforth called the "Alpin patent", which is entitled "Process of the Electrical Measurement of Well Casings", describes an apparatus which has two pairs of voltage measurement electrodes which positively engage the interior of the casing. However, the Alpin patent does not have any suitable calibration means to calibrate for thickness variations nor errors in the placements of the electrodes. Therefore, the Alpin patent does not describe the methods and apparatus disclosed herein.

U.S. Pat. No. 2,729,784, issued on Jan. 3, 1956 having the title of "Method and Apparatus for Electric Well Logging", and U.S. Pat. No. 2,891,215 issued on Jun. 16, 1959 having the title of "Method and Apparatus for Electric Well Logging", both of which issued in the name of Robert E. Fearon, henceforth called the "Fearon patents", describe apparatus also having two pairs of voltage measurement electrodes which engage the interior of the casing. However, an attempt is made in the Fearon patents to produce a "virtual electrode" on the casing in an attempt to measure leakage current into formation which provides for methods and apparatus which are unrelated to the Kaufman and Vail patents cited above. The Fearon patents neither provide calibration means, nor do they provide methods similar to those described in either the Kaufman patent or the Vail patents, to calibrate for thickness variations and errors in the placements of the electrodes. Therefore, the Fearon patents do not describe the methods and apparatus disclosed herein.

Accordingly, an object of the invention is to provide new and practical methods of measuring the resistivity of geological formations from within a first cased well which is responsive to fluids injected into the geological formation from a second cased well.

Another object of the invention is to provide new and practical apparatus to measure geological information from within a first cased well which is responsive to fluids injected into formation from a second cased well.

The invention is described in two major different portions of the specification. In the first major portion of the specification, relevant parts of the text in Ser. No. 07/089,697 are repeated herein which describe apparatus defined in FIGS. 1, 3, 4, and 5. The second major portion of the specification herein is concerned with providing both apparatus and methods which allow measurement of geological formation properties during fluid flooding operations in oil fields having at least two cased wells.

Figure 1:
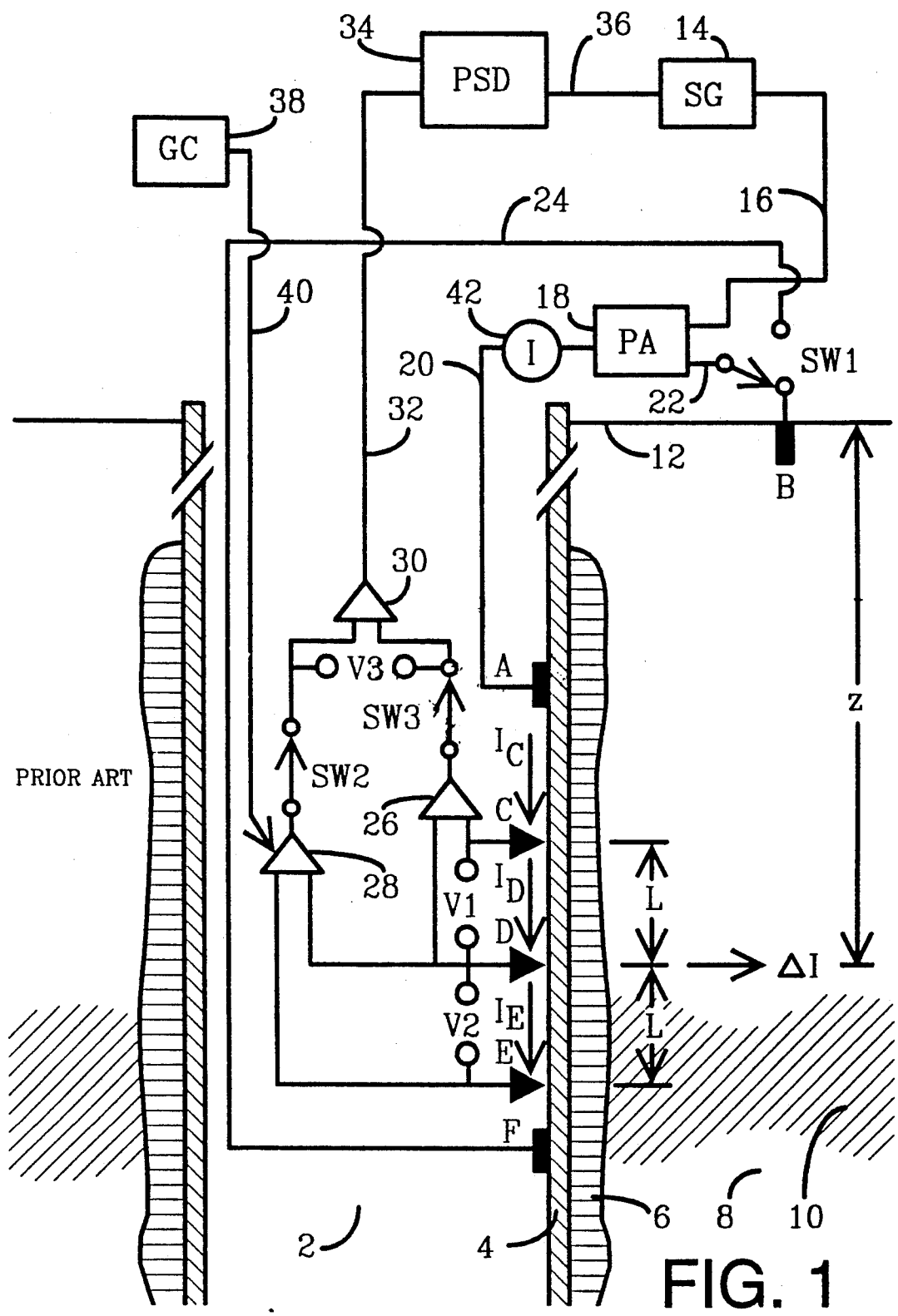
FIG. 1 is a sectional view of one preferred embodiment of the invention of the Thru Casing Resistivity Tool (TCRT) which is marked with the legend "Prior Art".

FIGS. 1, 2, 3, 4, and 5 in Ser. No. 07/089,697 and in those contained in this application are nearly identical. The following excerpt is taken word-for-word from Ser. No. 07/089,697:

"FIG. 1 shows a typical cased borehole found in an oil field. The borehole 2 is surrounded with borehole casing 4 which in turn is held in place by cement 6 in the rock formation 8. An oil bearing strata 10 exists adjacent to the cased borehole. The borehole casing may or may not extend electrically to the surface of the earth 12. A voltage signal generator 14 (SG) provides an A.C. voltage via cable 16 to power amplifier 18 (PA). The signal generator represents a generic voltage source which includes relatively simple devices such as an oscillator to relatively complex electronics such as an arbitrary waveform generator. The power amplifier 18 is used to conduct A.C. current down insulated electrical wire 20 to electrode A which is in electrical contact with the casing. The current can return to the power amplifier through cable 22 using two different paths. If switch SW1 is connected to electrode B which is electrically grounded to the surface of the earth, then current is conducted primarily from the power amplifier through cable 20 to electrode A and then through the casing and cement layer and subsequently through the rock formation back to electrode B and ultimately through cable 22 back to the power amplifier. In this case, most of the current is passed through the earth. Alternatively, if SW1 is connected to insulated cable 24 which in turn is connected to electrode F, which is in electrical contact with the casing, then current is passed primarily from electrode A to electrode F along the casing for a subsequent return to the power amplifier through cable 22. In this case, little current passes through the earth.

Electrodes C, D, and E are in electrical contact with the interior of casing. In general, the current flowing along the casing varies with position. For example, current $I_C$ is flowing downward along the casing at electrode C, current $I_D$ is flowing downward at electrode D, and current $I_E$ is flowing downward at electrode E. In general, therefore, there is a voltage drop V1 between electrodes C and D which is amplified differentially with amplifier 26. And the voltage difference between electrodes D and E, V2, is also amplified with amplifier 28. With switches SW2 and SW3 in their closed position as shown, the outputs of amplifiers 26 and 28 respectively are differentially subtracted with amplifier 30. The voltage from amplifier 30 is sent to the surface via cable 32 to a phase sensitive detector 34. The phase sensitive detector obtains its reference signal from the signal generator via cable 36. In addition, digital gain controller 38 (GC) digitally controls the gain of amplifier 28 using cable 40 to send commands downhole. The gain controller 38 also has the capability to switch the input leads to amplifier 28 on command, thereby effectively reversing the output polarity of the signal emerging from amplifier 28 for certain types of measurements.

The total current conducted to electrode A is measured by element 42. In the preferred embodiment shown in FIG. 1, the A.C. current used is a symmetric sine wave and therefore in the preferred embodiment, I is the 0-peak value of the A.C. current conducted to electrode A. (The 0-peak value of a sine wave is ½ the peak-to-peak value of the sine wave.)

In general, with SW1 connected to electrode B, current is conducted through formation. For example, current $\Delta I$ is conducted into formation along the length 2 L between electrodes C and E. However, if SW1 is connected to cable 24 and subsequently to electrode F, then no current is conducted through formation to electrode B. In this case, $I_C = I_D = I_E$ since essentially little current $\Delta I$ is conducted into formation.

It should be noted that if SW1 is connected to electrode B then the current will tend to flow through the formation and not along the borehole casing. Calculations show that for 7 inch O.D. casing with a ½ inch wall thickness that if the formation resistivity is 1 ohm-meter and the formation is uniform, then approximately half of the current will have flowed off the casing and into the formation along a length of 320 meters of the casing. For a uniform formation with a resistivity of 10 ohm-meters, this length is 1040 meters instead." These lengths are respectively called "Characteristic Lengths" appropriate for the average resistivity of the formation and the type of casing used. A Characteristic Length is related to the specific length of casing necessary for conducting on approximately one-half the initial current into a particular geological formation as described below.

One embodiment of the invention described in Ser. No. 07/089,697 provides a preferred method of operation for the above apparatus as follows: "The first step in measuring the resistivity of the formation is to "balance" the tool. SW1 is switched to connect to cable 24 and subsequently to electrode F. Then A.C. current is passed from electrode A to electrode F thru the borehole casing. Even though little current is conducted into formation, the voltages V1 and V2 are in general different because of thickness variations of the casing, inaccurate placements of the electrodes, and numerous other factors. However, the gain of amplifier 28 is adjusted using the gain controller so that the differential voltage V3 is nulled to zero. (Amplifier 28 may also have phase balancing electronics if necessary to achieve null at any given frequency of operation.) Therefore, if the electrodes are subsequently left in the same place after balancing for null, spurious effects such as thickness variations in the casing do not affect the subsequent measurements.

With SW1 then connected to electrode B, the signal generator drives the power amplifier which conducts current to electrode A which is in electrical contact with the interior of the borehole casing. A.C. currents from 1 amp o-peak to 30 amps o-peak at a frequency of typically 1 Hz are introduced on the casing here. The low frequency operation is limited by electrochemical effects such as polarization phenomena and the invention can probably be operated down to 0.1 Hz and the resistivity still properly measured. The high frequency operation is limited by skin depth effects of the casing, and an upper frequency limit of the invention is probably 20 Hz for resistivity measurements. Current is subsequently conducted along the casing, both up and down the casing from electrode A, and some current passes through the brine saturated cement surrounding the casing and ultimately through the various resistive zones surrounding the casing. The current is then subsequently returned to the earth's surface through electrode B."

Figure 2:
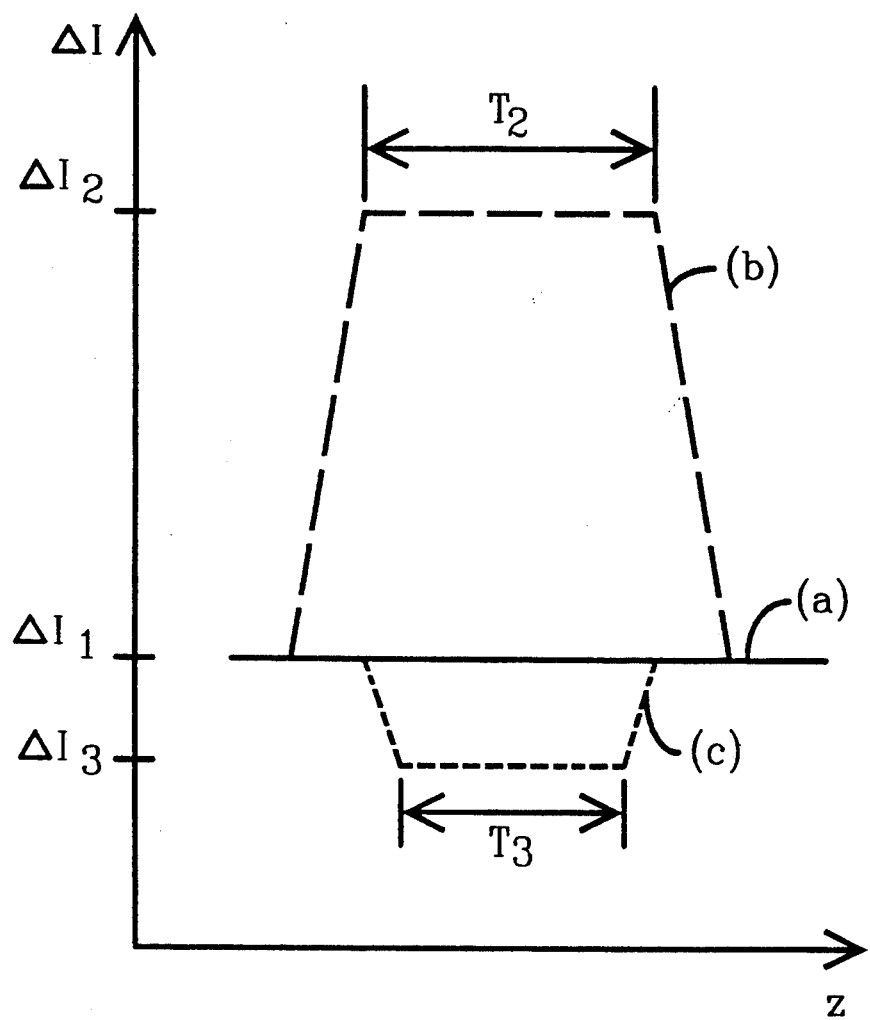
FIG. 2 shows $\Delta I$ vs. Z which diagrammatically depicts the response of the tool to different formations which is marked with the legend "Prior Art".

Quoting further from Ser. No 07/089,697: "FIG. 2 shows the differential current conducted into formation $\Delta I$ for different vertical positions z within a steel cased borehole. Z is defined as the position of electrode D in FIG. 1. It should be noted that with a voltage applied to electrode A and with SW1 connected to electrode B that this situation consequently results in a radially symmetric electric field being applied to the formation which is approximately perpendicular to the casing. The electrical field produces outward flowing currents such as $\Delta I$ in FIG. 1 which are inversely proportional to the resistivity of the formation. Therefore, one may expect discontinuous changes in the current $\Delta I$ at the interface between various resistive zones particularly at oil/water and oil/gas boundaries. For example, curve (a) in FIG. 2 shows the results from a uniform formation with resistivity $\rho_1$. Curve (b) shows departures from curve (a) when a formation of resistivity $\rho_2$ and thickness $T_2$ is intersected where $\rho_2$ is less than $\rho_1$. And curve (c) shows the opposite situation where a formation is intersected with resistivity $\rho_3$ which is greater than $\rho_1$ which has a thickness of $T_3$. It is obvious that under these circumstances, $\Delta I_3$ is less than $\Delta I_1$, which is less than $\Delta I_2$.

Figure 3:
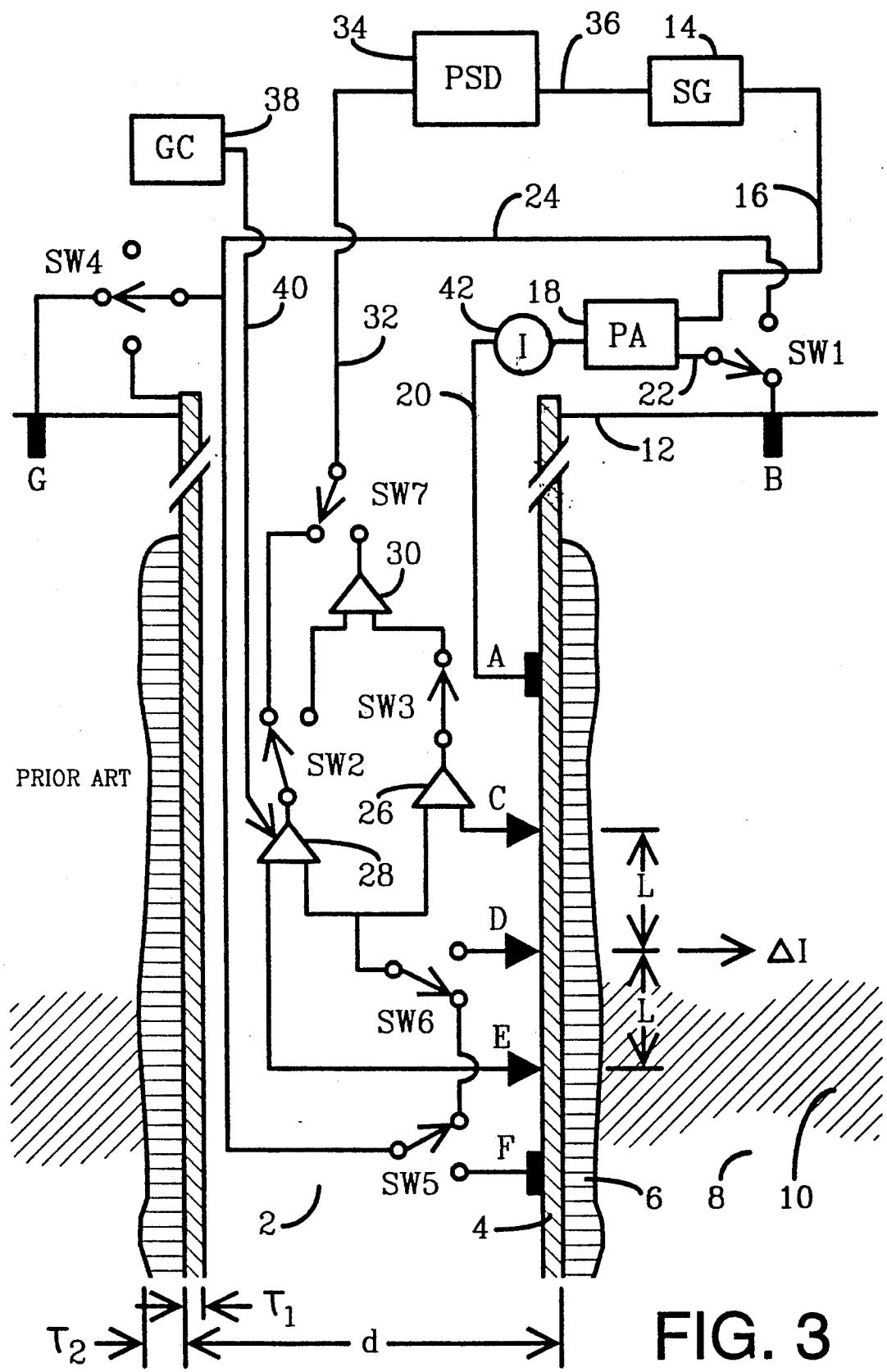
FIG. 3 is a sectional view of a preferred embodiment of the invention which shows how $V_o$ is to be measured that is marked with the legend "Prior Art".

FIG. 3 shows a detailed method to measure the parameter Vo. Electrodes A, B, C, D, E, and F have been defined in FIG. 1. All of the numbered elements 2 through 40 have already been defined in FIG. 1. In FIG. 3, the thickness of the casing is $\tau_1$, the thickness of the cement is $\tau_2$, and d is the diameter of the casing. Switches SW1, SW2, and SW3 have also been defined in FIG. 1. In addition, electrode G is introduced in FIG. 3 which is the voltage measuring reference electrode which is in electrical contact with the surface of the earth. This electrode is used as a reference electrode and conducts little current to avoid measurement errors associated with current flow.

In addition, SW4 is introduced in FIG. 3 which allows the connection of cable 24 to one of the three positions: to an open circuit; to electrode G; or to the top of the borehole casing. And in addition in FIG. 3, switches SW5, SW6, and SW7 have been added which can be operated in the positions shown. (The apparatus in FIG. 3 can be operated in an identical manner as that shown in FIG. 1 provided that switches SW2, SW5, SW6, and SW7 are switched into the opposite states as shown in FIG. 3 and provided that SW4 is placed in the open circuit position.)

With switches SW2, SW5, SW6, and SW7 operated as shown in FIG. 3, then the quantity Vo may be measured. For a given current I conducted to electrode A, then the casing at that point is elevated in potential with respect to the zero potential at a hypothetical point which is an "infinite" distance from the casing. Over the interval of the casing between electrodes C, D, and E in FIG. 3, there exists an average potential over that interval with respect to an infinitely distant reference point. However, the potential measured between only electrode E and electrode G approximates Vo provided the separation of electrodes A, C, D, and E are less than some critical distance such as 10 meters and provided that electrode G is at a distance exceeding another critical distance from the casing such as 10 meters from the borehole casing. The output of amplifier 28 is determined by the voltage difference between electrode E and the other input to the amplifier which is provided by cable 24. With SW1 connected to electrode B, and SW4 connected to electrode G, cable 24 is essentially at the same potential as electrode G and Vo is measured appropriately with the phase sensitive detector 34. In many cases, SW4 may instead be connected to the top of the casing which will work provided electrode A is beyond a critical depth . . .".

Quoting further from Ser. No. 07/089,697: "For the purposes of precise written descriptions of the invention, electrode A is the upper current conducting electrode which is in electrical contact with the interior of the borehole casing; electrode B is the current conducting electrode which is in electrical contact with the surface of the earth; electrodes C, D, and E are voltage measuring electrodes which are in electrical contact with the interior of the borehole casing; electrode F is the lower current conducting electrode which is in electrical contact with the interior of the borehole casing; and electrode G is the voltage measuring reference electrode which is in electrical contact with the surface of the earth.

Furthermore, $V_o$ is called the local casing potential. An example of an electronics difference means is the combination of amplifiers 26, 28, and 30. The differential current conducted into the formation to be measured is $\Delta I$." The differential voltage is that voltage in FIG. 1 which is the output of amplifier 30 with SW1 connected to electrode B and with all the other switches in the positions shown.

Figure 4:
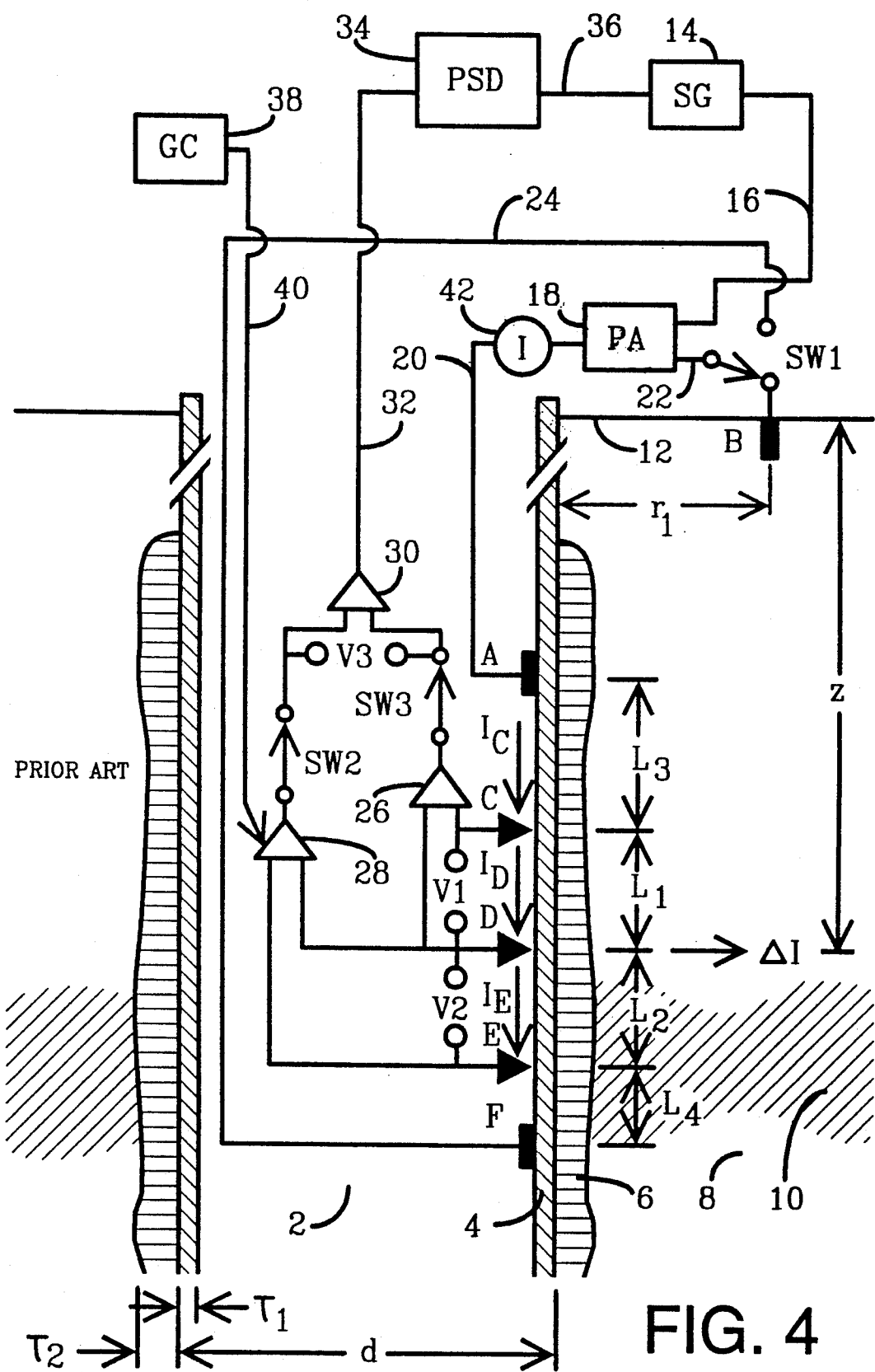
FIG. 4 is a sectional view of an embodiment of the invention which has voltage measurement electrodes which are separated by different distances that is marked with the legend "Prior Art".
Figure 5:
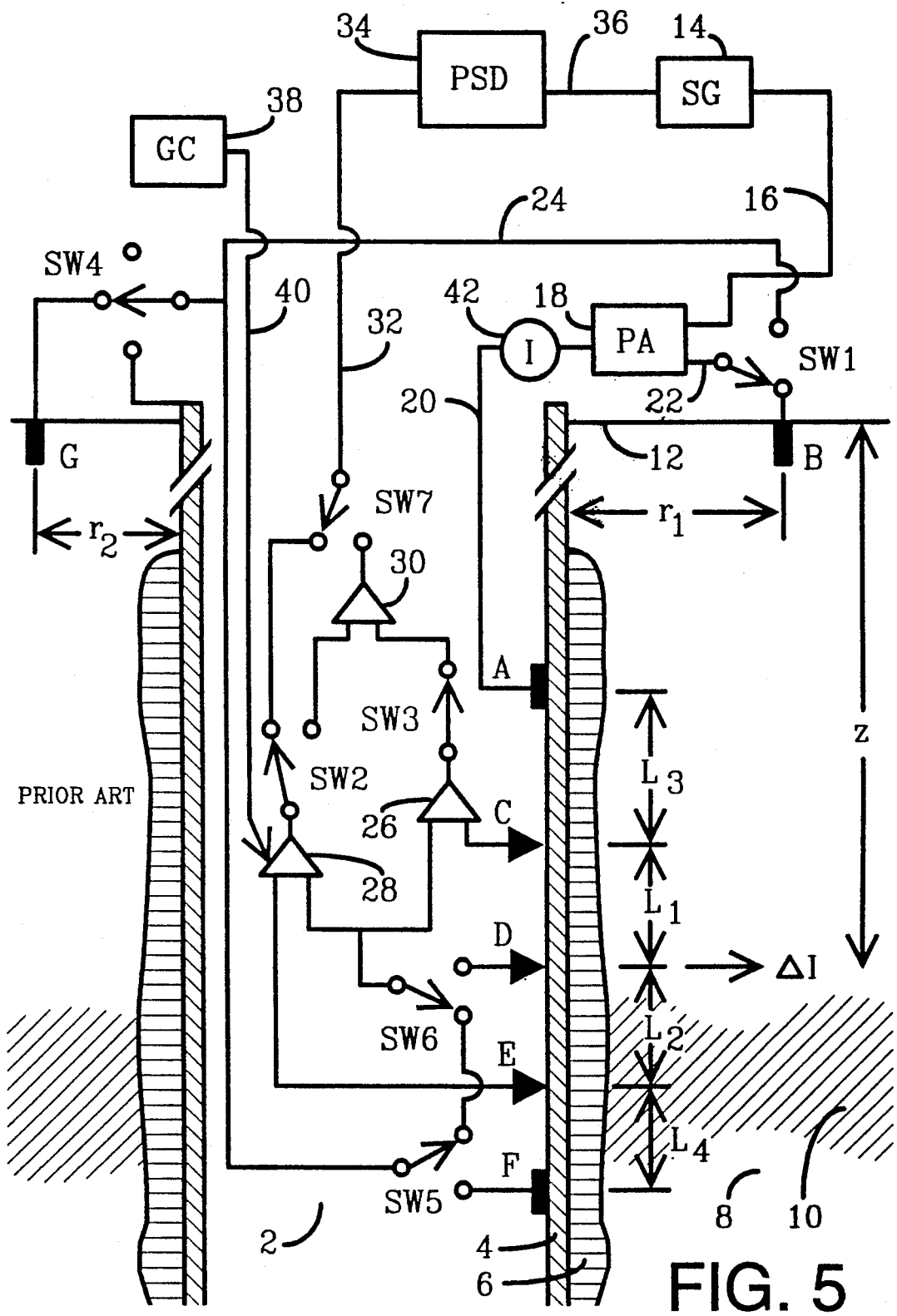
FIG. 5 is a sectional view of an embodiment of the invention which has electrodes which are separated by different distances and which shows explicitly how to measure $V_o$ that is marked with the legend "Prior Art".

Further quoting from Ser. No. 07/089,697: "FIG. 4 is nearly identical to FIG. 1 except the electrodes C and D are separated by length $L_1$, electrodes D and E are separated by $L_2$, electrodes A and C are separated by $L_3$ and electrodes E and F are separated by the distance $L_4$. In addition, $r_1$ is the radial distance of separation of electrode B from the casing. And Z is the depth from the surface of the earth to electrode D. FIG. 5 is nearly identical to FIG. 3 except here too the distances $L_1$, $L_2$, $L_3$, $L_4$, $r_1$, and Z are explicitly shown. In addition, $r_2$ is also defined which is the radial distance from the casing to electrode G. As will be shown explicitly in later analysis, the invention will work well if $L_1$ and $L_2$ are not equal. And for many types of measurements, the distances $L_3$ and $L_4$ are not very important provided that they are not much larger in magnitude than $L_1$ and $L_2$."

Figure 6:
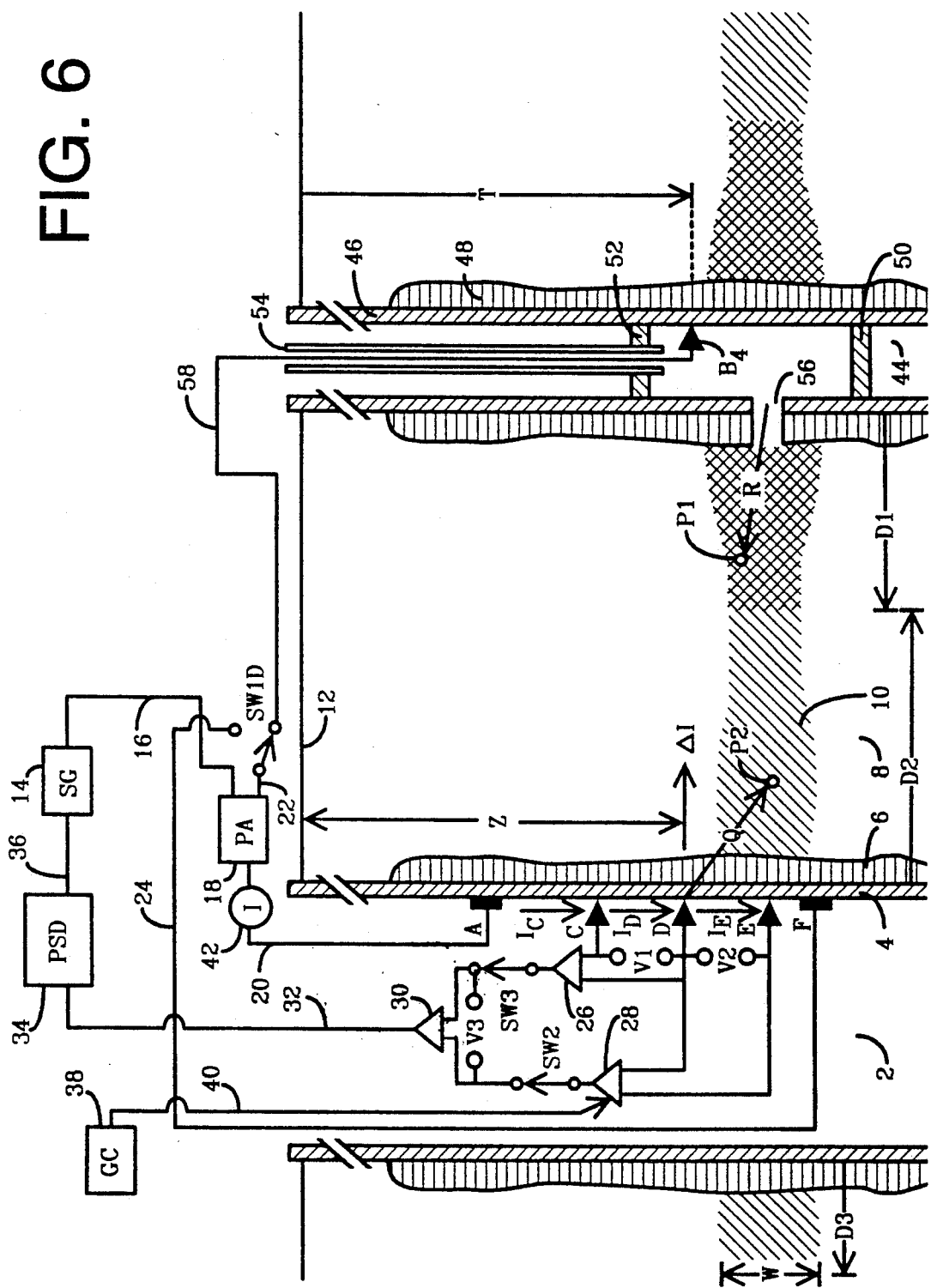
FIG. 6 shows a sectional view an embodiment of the invention which provides measurements within a first cased well that is responsive to fluids injected into formation from a second cased well.

FIG. 6 shows two cased wells in a geological formation. Elements in FIG. 6 labeled with numbers 2–42 have already been described. The legends associated with the apparatus in the first well 2 surrounded with casing 4 have also already been defined. FIG. 6 further shows a second well 44 surrounded by second borehole casing 46 which in turn may have cement 48 present. A lower bridge plug 50 is installed. The upper plug 52 is penetrated by production tubing 54. Fluids are normally injected using a pump into the production tubing that forces flooding fluids into formation through perforations 56 in the second cased well, although FIG. 6 does not show that pump and associated hardware which is normally attached to the tubing. Such flooding fluids are used during enhanced oil recovery operations, otherwise called secondary oil recovery.

Flooding fluids are forced into formation which may be described by the vector direction R from the perforations 56 to any point P1 within the region of fluid flooding. The region of flooding can be described as a vector field comprised of the vectors to such points P1 within the flooded region. (R is a vector, having three dimensional components which can be Cartesian components. More typically, R can be best described with cylindrical components wherein absolute (R) is its magnitude, $\Theta R$ is the angle from vertical, and $\Phi R$ is the appropriate azimuthal angle.)

A simple planar flooding front is shown a first horizontal distance D1 away from the perforations 56 in FIG. 6. That same front is located a second distance D2 horizontally away from casing 4. The width W at a particular third distance D3 away from casing 4 is shown, the width of the producing zone being of considerable importance in the description of the reservoir. The width W can be used to describe the width of the flooding region and/or the remaining oil in place depending upon which is appropriate.

The cased wells in FIG. 6 are vertical, and separated by a distance of separation DS that is not shown in FIG. 6 for simplicity. In general, of course, each separate casing follows a complex three dimensional trajectory downward in the earth, and each well may be separated at any given vertical distance by various distances of separation DS. However, FIG. 6 does not show that complexity again for the purposes of simplicity.

The oil remaining in place may be described precisely by the vector field comprised of vectors Q pointing to various points P2 as shown in FIG. 6. (The vector Q can be described with cylindrical components wherein absolute (Q) it its magnitude, $\Theta Q$ is the angle from vertical, and $\Phi Q$ is the appropriate azimuthal angle.)

SW1 in FIG. 1 has been replaced by SW1D in FIG. 6. When SW1D is connected to cable 24 in FIG. 6, the measurement apparatus passes current from electrode A to electrode F to calibrate the apparatus in accordance with the apparatus and methods described in FIG. 1. When SW1D is instead connected to cable 58 that is attached to electrode $B_4$, current is conducted from that electrode to electrode A. Electrode $B_4$ is in electrical contact with casing 46 and is a distance T below the surface of the earth. When SW1D is connected to cable 58, then A.C. current is conducted from the power amplifier 18 through cable 20 to electrode A to casing 4 which then passes through the intervening geological formation and possible cement layers to casing 46 to electrode $B_4$ and then back through cable 58 to cable 22 and then back to power amplifier 18. The passage of such A.C. current causes the generation of time varying electric fields on the exterior surfaces of the two respective casings which have components which are perpendicular to the respective casings which cause the conduction of the A.C. current itself through the intervening geological formations. The time varying electric field on the exterior of a casing at any one point is responsible for causing the leakage current conducted into the formation at that point.

In one embodiment, for particular a given depth T, the current leakage $\Delta I$ is then measured for various depths Z. Then for another particular depth T, the quantity $\Delta I$ is again measured for various depths Z. If the distance of separation between the two casings is very large compared to the Characteristic Length ("CL") appropriate for the casing and geology present, then the quantity $\Delta I$ from casing 4 is relatively unresponsive to the presence of the casing 46.

If instead the distance between the two casings is on the order of the Characteristic Length for the problem, or less than that length, and provided that there is a resistivity difference between the "un-swept" formation and the formation having the injected fluids, then it is evident that the quantity $\Delta I$ measured from within casing 4 will be substantially affected by the presence of current electrode $B_4$ inside casing 46. Under these circumstances, repetitively measuring the quantity $\Delta I$ vs. Z for different values of T will yield information related to the depth of penetration of flooding fluids D1, the remaining un-swepted oil in formation 10 of depth D2. Such measurements will also be dependent upon the thickness W of the geological zones of interest. Such measurements will also be dependent upon the average angle of inclination of the reservoir from horizontal, although that angle is not shown in FIG. 6.

A Characteristic Length CL of the formation may be conveniently calculated as that particular length wherein (a) the resistance to current flow into the adjacent geological formation over a length of casing CL which is the "contact resistance" of that particular length (given by Equation 6 in U.S. Pat. No. 4,882,542 with change of variables using CL=2 L) becomes equal to (b) the total series resistance to current flow along the characteristic length CL of the casing computed by multiplying the Characteristic Length CL times the average resistance per unit length of the casing (given by Equation 1 in U.S. Pat. No. 4,882,542 for a particular example of 7 inch O.D. casing). The resulting equation is a transcendental equation for the quantity CL which is explicitly shown below:

$$(CL)(r) = \rho\{Ln[2(LC)/d]\}/2\pi(LC) \quad \text{Equation 1}$$

Here, CL is the Characteristic Length, r is the average resistance per unit length of the casing, $\rho$ is the resistivity of an assumed uniform half-space model, and d is the outside diameter of the casing.

In particular, these measurements provide information about the position of the flooding front a distance D2 away from casing 4. In many instances, it is not known where this flooding front is located relative to casing 4. Therefore, the apparatus and method of operation have been described which allow the determination of geophysical information from within a first cased well that is responsive to flooding fluids being injected into formation from a second cased well.

Various flooding fluids are used in the industry. Salt water from the ocean is common. Sometimes waste waters from various sources are used. Alternatively, carbon dioxide is used which may be either a fluid or a gas, but which is detected in a similar manner as already discussed. Under ideal circumstances the resistivities of the injected fluids are known so that from measurements of $\Delta I$, the vector field R of the injected fluids can be determined using typical geophysical analysis techniques. Therefore, using typical geophysical analysis techniques, the vector field Q can also be determined—namely the unswept portions of the reservoir can be determined.

Such measurements are very important in the oil industry during enhanced oil recovery operations. For example, such measurements may be performed which could be used to predict that perforating casing 46 at a different vertical position would yield better oil production into casing 4. The depth from the surface of the earth to the perforations 56 in FIG. 6, defined as the Injector Perforation Depth ("IPD"), is not shown for simplicity. The perforations in casing 4 at the producing horizon are not shown for simplicity in FIG. 6. The depth from the surface of the earth to those perforations in casing 4, defined as the Production Perforation Depth ("PPD") is not shown in FIG. 6 for simplicity. In FIG. 6, well 2 is called the Producing Well and well 44 is called the Injector Well.

Analysis of the measurements obtained with the apparatus shown in FIG. 6 can be used with standard geophysical analysis techniques to predict the optimum choice of the Injector Perforation Depth and the optimum choice of the Production Perforation Depth. As is standard in the industry, sometimes there are of course multiple injector horizons and multiple production horizons. Therefore, the invention provides information used to optimize the placements of perforations used to inject fluids into formation and the placements of perforations used to produce fluids from the formations.

FIG. 6 shows the situation wherein electrode $B_4$ is placed within the well which acts as the fluid injector. However, of equal importance is the reverse situation wherein $B_4$ is placed in the Producing Well 2, and the measurement apparatus having electrodes C, D, and E is instead placed inside the Injector Well 44. However, such reversal of parts of the apparatus is a small variation of the invention.

It should be noted that electrode $B_4$ can be placed in electrical contact within the production tubing 54 at any vertical position T from the surface of the earth. Conduction of current from tubing 54 through usually conducting fluids surrounding the tubing to casing 46 will serve as a suitable method to conduct current into the adjacent geological formation from electrode $B_4$. The electrode $B_4$ can also be placed in electrical contact with the casing 46 as it protrudes from the surface of the earth during the measurement process.

It is also possible to pass current between two cased wells and perform measurements with the apparatus in a third well. Passing currents between two or more cased wells and using an apparatus to measure current leakage as shown in FIG. 6 is also a small variation of the invention.

Of course, any oil field undergoing enhanced oil recovery has many such Producing Wells and Injector Wells. It is evident that the invention herein may be used to optimize production in the entire oil field having many such wells.

Certain embodiments of the invention in U.S. Pat. No. 4,882,542 and U.S. Pat. No 4,820,989 teach the utility of first independently measuring the leakage current $\Delta I$ and potential voltage with respect to an electrode located at infinity $V_o$, dividing the two to obtain a Contact Resistance $R_c$, and multiplying that Contact Resistance times a Calibration Constant K having units of meters to obtain the resistivity $\rho$ of the adjacent geological formation. If the two cased wells are separated by a distance on the order of, or less than, the Characteristic Length appropriate for the problem, an effective resistivity, or Apparent Resistivity ("Apparent ($\rho$)"), is in fact influenced by the flooding zone and by the relative proximity of the wells. Plots of the Apparent Resistivity vs. depth within the first cased well Z for different depths of electrode $B_4$ in the second cased well can be interpreted using standard geophysical techniques to infer the dimensions of the flooded zone during enhanced oil production activities. Such measurements may be used as to optimize the placements of perforations used to inject fluids into formation and the placements of perforations used to produce fluids from the formations.

While the above description contains many specificities, these should not be construed as limitations on the scope of the invention, but rather as exemplification of preferred embodiments thereto. As has been briefly described, there are many possible variations. Accordingly, the scope of the invention should be determined not only by the embodiments illustrated, but by the appended claims and their legal equivalents.

What is claimed is:

1. An apparatus for measurement of the electrochemical properties of geological formations penetrated by two conductive borehole casings, comprising:

a plurality of three vertically spaced apart voltage measuring electrodes disposed at substantially equal intervals within a first cased well, each said voltage measuring electrode being in electrical contact with the interior of the first borehole casing and positioned adjacent to a formation of interest;

first detection means providing the voltage differential between a first pair of said spaced apart voltage measuring electrodes;

second detection means providing the voltage differential between a second pair of said spaced apart voltage measuring electrodes;

a first current conducting electrode disposed within and engaged in electrical contact with said first casing on a first vertical side of said voltage measuring electrodes;

a second current conducting electrode disposed within and engaged in electrical contact with said first casing on a second vertical side of said voltage measuring electrodes opposite the first current conducting electrode;

a third current conducting electrode disposed within and engaged in electrical contact with a second borehole casing;

first conducting means for applying a first sinusoidal alternating current having a first predetermined frequency to said first electrode in a manner requiring at least a portion of the first alternating current to pass from said first electrode in said first cased well through said formation of interest to said third current conducting electrode located in said second cased well;

second conducting means for simultaneously applying a second sinusoidal alternating current having a second predetermined frequency to said first electrode in a manner that requires a majority of the second alternating current to pass through the portion of the casing between said first and second current conducting electrodes within said first borehole casing;

wherein a first output of said first detection means is measured in response to said first alternating current;

wherein a second output of said second detection means is measured in response to said first alternating current;

wherein a third output of said first detection means is measured in response to said second alternating current;

wherein a fourth output of said second detection means is measured in response to said second alternating current;

whereby said first, second, third, and fourth outputs are utilized to measure electrochemical properties of geological formations in the region of the formation in the vicinity of said first and second cased boreholes, including those electrochemical properties responsive to any fluids injected into formation during any secondary oil production activities in the region of the geological formation containing the two cased wells.

2. The apparatus recited in claim 1 wherein said first predetermined frequency is equal to said second predetermined frequency.

3. The apparatus recited in claim 1 wherein the two cased wells are separated by distances which are less than a characteristic length appropriate for the casings and the geology in the region of the formation penetrated by the two cased wells.

4. A method for measuring electrochemical phenomena of geological formations penetrated by two cased boreholes comprising the steps of:

applying a first sinusoidal alternating current having a first frequency to a first borehole casing at a first entry point in the proximity of a geological formation to be tested;

selectively receiving at least a portion of said first alternating current at a point within a second borehole casing to insure that a significant portion said first current introduced at the first entry point is conducted from said first borehole casing through the intervening geological formations to the second borehole casing;

detecting the voltage levels present at a plurality of at least three spaced apart voltage measuring points along the first borehole casing, wherein the disposition of voltage measuring points defines a portion of the casing that is adjacent to the specific geological formation to be tested;

simultaneously conducting a second alternating current having a second frequency from a second entry point on the first borehole casing, through said portion of the first casing defined by said spaced apart voltage measuring points, and to a first exit point on the casing, said second entry point and said first exit point being located on opposite sides of said portion of the first casing defined by said spaced apart voltage measuring points;

simultaneously measuring the differential voltages between a plurality of discrete pairs of said spaced apart points at the first and second frequencies;

using the measurements at said first and second frequencies to determine the electrochemical properties of the adjacent geological formation that includes the changes in the geological formations due to any fluids injected in the region of the geological formation penetrated by said two borehole casings.

5. The method as recited in claim 4 wherein said first frequency and said second frequency are equivalent.

6. An apparatus for measuring electronic properties of geological formations penetrated by two boreholes, wherein a first metallic pipe is positioned within a first borehole, and wherein a second metallic pipe is positioned within a second borehole, wherein said second metallic pipe possesses perforations used for injecting fluids into the geological formations, said apparatus comprising:

generating means for generating time varying electric fields on the exterior surfaces of the first and second metallic pipes whereby said electric fields have at least components which are perpendicular to the first and second metallic pipes thereby causing a total time varying current to be conducted between the metallic pipes through the geological formations between the two metallic pipes; and measurement means for simultaneously measuring the time varying differential current conducted into the formation from a predetermined portion of the first metallic pipe adjacent to the specific portion of the formation to be measured to determine electronic properties of formations, thereby providing measurements responsive to any fluids injected into formation from said second metallic pipe.

7. A method of measuring electronic properties of geological formations penetrated by two boreholes, wherein a first metallic pipe is positioned within a first borehole, and wherein a second metallic pipe is positioned within a second borehole, wherein said second metallic pipe possesses perforations used for injecting fluids into the geological formations, said method comprising:

applying time varying electronic fields on the exterior surfaces of the first and second metallic pipes whereby said electric fields have at least components which are perpendicular to the the first and second metallic pipes thereby causing a total time varying current to be conducted between the metallic pipes through the geological formations between the two metallic pipes; and simultaneously measuring the time varying differential current conducted into the formation from a predetermined portion of the first metallic pipe adjacent to the specific portion of the formation to be measured to determine electronic properties of formations, thereby providing information that is responsive to any fluids injected into formation from said second metallic pipe.

8. A method of geophysical analysis to determine the placements of production perforations within a cased oil producing well and the placements of injector perforations within a cased fluid injector well in an oil field to optimize oil production from the producing well while fluids are injected into formation from the fluid injector well comprising the following steps:

conducting A.C. current between the cased producing well and the cased fluid injector well;

measuring the leakage current flowing into the intervening geological formations between the two cased wells at various predetermined positions from within the cased production well thereby providing geophysical information;

using that geophysical information at least in part to determine the optimum placements of production perforations used to produce fluids from formation in the cased production well; and using said geophysical information at least in part to determine the optimum placements of injector perforations used to inject fluids into formation from the cased injector well.

9. A method of geophysical analysis to determine the placements of production perforations within a cased oil producing well and the placements of injector perforations within a cased fluid injector well in an oil field to optimize oil production from the producing well while fluids are injected into formation from the fluid injector well comprising the following steps:

conducting A.C. current between the cased producing well and the cased fluid injector well;

measuring the leakage current flowing into the intervening geological formations between the two cased wells at various predetermined positions from within the cased injector well thereby providing geophysical information;

using that geophysical information at least in part to determine the optimum placements of production perforations used to produce fluids from the formation in the cased production well; and using said geophysical information at least in part to determine the optimum placements of injector perforations used to inject fluids into formation from the cased injector well.

* * * * *